United States Patent [19]

Uroshevich

[11] 4,349,013

[45] Sep. 14, 1982

[54] SOLAR ENERGY RECEIVERS

[75] Inventor: Miroslav Uroshevich, Cincinnati, Ohio

[73] Assignee: Alpha Solarco Inc., Cincinnati, Ohio

[21] Appl. No.: 275,841

[22] Filed: Jun. 22, 1981

Related U.S. Application Data

[63] Continuation-in-part of Ser. No. 52,085, Jun. 25, 1979, abandoned.

[51] Int. Cl.³ .................................................. F24J 3/02
[52] U.S. Cl. .................................... 126/442; 126/438; 126/449
[58] Field of Search ............... 126/442, 444, 438, 443, 126/449, 446, 439; 165/109; 138/38

[56] References Cited

U.S. PATENT DOCUMENTS

| 1,345,758 | 7/1920 | Folsom | 126/438 |
| 2,310,970 | 2/1943 | Limpert | 165/184 |
| 2,475,544 | 7/1949 | Del Cueto | 126/443 |
| 2,608,968 | 9/1952 | Moseley | 126/442 |
| 3,974,824 | 8/1976 | Smith | 126/438 |
| 3,983,861 | 10/1976 | Beauchaine | 126/442 |
| 3,989,104 | 11/1976 | Newton | 138/38 |
| 4,090,559 | 5/1978 | Megerlin | 138/38 |
| 4,134,391 | 1/1979 | Mahdjuri | 126/443 |
| 4,155,346 | 5/1979 | Aresty | 126/447 |

FOREIGN PATENT DOCUMENTS 1108431 10/1959 France .............................. 126/443

Primary Examiner—James C. Yeung
Attorney, Agent, or Firm—Gary M. Gron

[57] ABSTRACT

The disclosure illustrates an elongated receiver for a solar energy collector of the focusing type. The heat transfer fluid passage in the receiver contains an element having a plurality of tines to promote turbulence and a tube plugged at both ends to direct the heat transfer fluid only along the walls of the receiver that are exposed to solar radiation. Both treatments to the passage increase the heat transferred to the fluid.

7 Claims, 3 Drawing Figures

SOLAR ENERGY RECEIVERS

This application is a continuation-in-part of Application Ser. No. 052,085 filed on June 25, 1979, abandoned.

One of the principle elements of a solar energy collector is the receiver. It is the element that absorbs solar radiation and converts it into heat which is transferred to a heat transfer fluid flowing through a passage or passages in the receiver. It is apparent that more efficient heat transfer in the receiver will promote better overall collector performance.

A number of past attempts have been made to increase the heat transfer of the receiver. One approach, shown in U.S. Pat. No. 3,974,824, is to provide a plurality of tines or other heat conductive elements that extend outward from a tube through which the heat transfer fluid passes. Other designs have placed heat transfer and/or reflective fins within the heat transfer fluid passage as shown in U.S. Pat. Nos. 4,003,366; 4,026,273, and 4,074,678. Although they may increase heat transfer to the fluid, these arrangements do so at the expense of compactness, which is a prime consideration in a solar collector. The fins add greatly to the bulk of the receiver and overall size of the collector. Furthermore they add unnecessary complexity to the unit.

The above problems are solved in an elongated heat conductive solar energy receiver having a through passage for heat transfer fluid. An elongated flow directing element is positioned within the passage to direct flow only adjacent the portion of the receiver which receives heat from solar radiation. An element having a plurality of tines extending radially outwardly is positioned in the through passage, there being sufficient numbers of tines to produce turbulent flow through said passage and thus increase heat transfer.

The above and other related features of the present invention will be apparent from a reading of the following description of the disclosure shown in the accompanying drawing and the novelty thereof pointed out in the appended claims:

Figure 1:
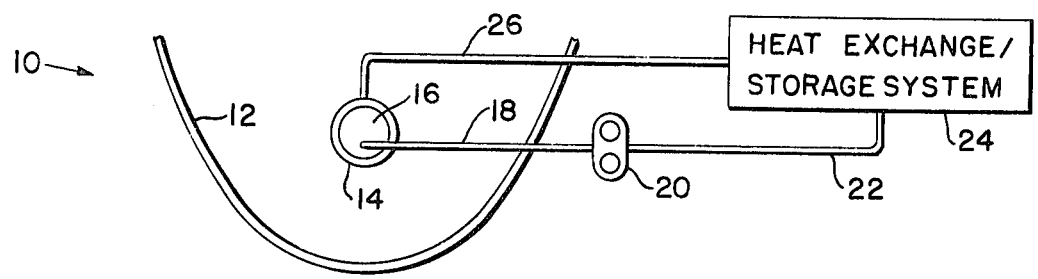
FIG. 1 illustrate a solar collector having a receiver which embodys the present invention.

FIG. 1 shows a solar collector 10 comprising an elongated reflector element 12 having a parabolic or other curved configuration that focuses the incoming beam component generally along an axis A. A receiver 14 of heat conductive material is positioned generally along axis A and has a cylindrical outer surface, the lower portion of which absorbs solar radiation that is reflected from element 12. A longitudinal passage 16 through receiver is supplied with heat transfer fluid, such as water, from a conduit extending to pump 20. Pump 20 receives fluid from a conduit 22 connected to a heat exchanger/heat storage system 24, and pressures it for flow through conduit 18, passage 16, and a conduit 26 which returns it to heat exchanger/heat storage system 24.

During periods where the beam component of solar radiation is present, it is focused by reflector 12 on receiver 14 where it is absorbed to increase the temperature of the heat transfer fluid to produce a useable heat output. In accordance with the present invention, the amount of heat transferred to the fluid is increased by increasing the heat transfer coefficient within passage 16.

Figure 2:
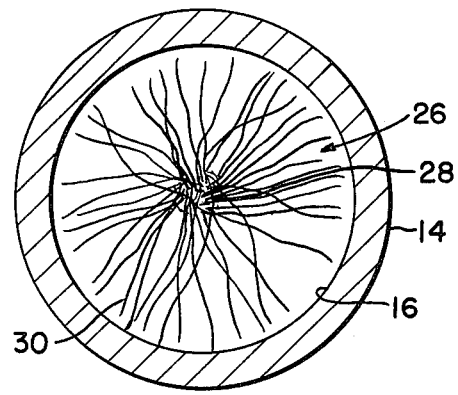
FIG. 2 is a cross-section view of one emodyment of the receiver of FIG. 1.

FIG. 2 shows one form of increasing the heat transfer. It comprises an elongated element 26 comprising a central core portion 28 and a plurality of tines 30 extending radially outward toward the walls of passage 16. Element 26 may be made as a wire brush where individual wires are wrapped around a core so that they extend outward in a random, but generally radial direction. It is preferable that the outer ends of the tines 30 abut the walls of passage so that the element 26 is piloted and supported within passage 26.

The plurality of tines 30 pose an obstruction in the fluid flow path so that turbulent flow is induced thereby increasing the heat transfer coefficient between the walls of passage 16, and the fluid flowing through it. The increase in heat transfer coefficient is realized at minimum cost and complexity since the element 26 may be made using the mass production techniques of making wire brushes. Furthermore, since the walls of passage 16 provide the sole support for element 26, it is not necessary to have elaborate support and positioning systems.

Figure 3:
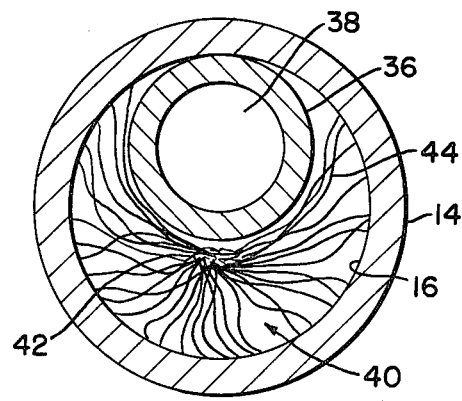
FIG. 3 is a cross-section view of another embodyment of the receiver of FIG. 1.

FIG. 3 shows an embodiment for further increasing the heat transfer. It consists of an elongated tubular element 36 positioned within passage 16 at the location which is remote from the reflected beam component of solar radiation. This position is at 12 o'clock as viewed in FIG. 3. Tubular element 36 may be supported by welding, an adhesive or other suitable means. The ends of element 36 are sealed off by plugs 38 to form a hollow plug with an air space within tube 36. When fluid is flowing through passage 16 it is directed only along the walls of the passage that are struck by the beam component of solar radiation that has been reflected from reflector 12. The plug does two things: First, it provides an air space insulation between the flowing fluid and the portion of the tube that faces away from the reflector 12. It is this area where radiation losses normally occur and the provision of the plug provides an internal barrier against such losses. Secondly, the plug forces the fluid to flow only along the region of passage 16 that experiences the maximum heat input. Thus, the losses from the passage are minimized at the same time the heat input is maximized.

In addition, an elongated element 40 is positioned within passage 16. Element 40 comprises a central core portion 42 and a plurality of tines. 44 extending outward toward the walls of passage 16. It should be noted that the core 42 is closer to the tube 36 than the inner wall of receiver 14 so as to further force fluid toward the portion of the receiver that receives the most solar radiation. The tines 44 abut the walls of passage 16 and generally conform to it "half-moon" shape. Preferably the tines 44 are secured to the walls by brazing or other fastening techniques which produce a good heat transfer bond.

The tines not only promote turbulence within passage 16 to increase heat transfer but they provide direct heat flow paths from the receiver walls to increase the surface area within passage 16. This combined with the plug 36 greatly increases the efficiencies of the receiver.

While preferred embodyments of the present invention have been described, it may be practiced in different forms without departing from the spirit and scope thereof.

Having thus described the invention what is claimed as novel and desired to be secured by Letters Patent of the United States is:

1. A solar energy receiver comprising:
   an elongated tubular heat conductive element having a portion of its exterior adapted to be exposed to solar radiation, said tubular element having a through passage for flowing fluid which is heated by heat transfer from said element;
   an elongated flow directing element positioned within said passage and against the passage wall that is away from the portion of the tubular element struck by solar radiation thereby directing fluid flow only adjacent the portion receiving heat from reflected solar radiation; and
   an elongated element comprising an elongated core extending through said passage in a direction generally parallel to fluid flow and a plurality of tines extending outward from said core that they generally extend across the flow path of fluid thereby promoting turbulence; whereby heat transfer to said fluid is maximized.

2. Apparatus as in claim 1 wherein the ends of said tines extend to the walls of said passage for generally piloting said elongated element within said passage.

3. Apparatus as in claim 2 wherein the ends of said tines are secured to the walls of said passage to increase heat transfer therefrom.

4. Apparatus as in claim 3 wherein the ends of said tines are secured to the walls of said passage by brazing.

5. Apparatus as in claim 4 wherein said flow directing element comprises a tube having its ends plugged.

6. Apparatus as in claim 5 wherein the core is positioned closer to said flow directing tube than it is to the interior wall of said tubular element forming the passage for further directing fluid adjacent the portion receiving heat from reflected solar radiation.

7. Apparatus as in claim 1 further comprising;
   an elongated reflector for receiving radiation and focusing it along an axis that is generally co-incident with the longitudinal axis of said heat conductive element; and,
   a means circulating the fluid through said passage to remove heat from said receiver.

* * * * *